US009282581B2

United States Patent
Cui et al.

(10) Patent No.: US 9,282,581 B2
(45) Date of Patent: *Mar. 8, 2016

(54) LOCATION-BASED WI-FI RADIO ACTIVATION AND DEACTIVATION FOR MOBILE DEVICES

(71) Applicant: AT&T Intellectual Property I, L.P., Atlanta, GA (US)

(72) Inventors: Zhi Cui, Sugar Hill, GA (US); Alan Blackburn, Woodstock, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/630,853

(22) Filed: Feb. 25, 2015

(65) Prior Publication Data

US 2015/0173112 A1 Jun. 18, 2015

Related U.S. Application Data

(63) Continuation of application No. 13/707,532, filed on Dec. 6, 2012, now Pat. No. 9,008,063.

(51) Int. Cl.
| | |
|---|---|
| H04W 4/00 | (2009.01) |
| H04W 76/02 | (2009.01) |
| H04W 12/06 | (2009.01) |
| H04W 12/04 | (2009.01) |
| H04W 84/12 | (2009.01) |
| H04L 29/06 | (2006.01) |

(Continued)

(52) U.S. Cl.
CPC ............... *H04W 76/02* (2013.01); *H04L 63/08* (2013.01); *H04W 12/04* (2013.01); *H04W 12/06* (2013.01); *H04W 76/00* (2013.01); *H04W 76/064* (2013.01); *H04W 84/042* (2013.01); *H04W 84/12* (2013.01); *H04W 48/20* (2013.01); *H04W 76/026* (2013.01)

(58) Field of Classification Search
CPC ...................................................... H04W 76/00
See application file for complete search history.

(56) References Cited

U.S. PATENT DOCUMENTS

| | | |
|---|---|---|
| 6,314,308 B1 | 11/2001 | Sheynblat et al. |
| 6,430,168 B1 | 8/2002 | Djurkovic et al. |

(Continued)

FOREIGN PATENT DOCUMENTS

| | | |
|---|---|---|
| EP | 2244503 | 10/2010 |
| EP | 2197228 | 12/2011 |

(Continued)

OTHER PUBLICATIONS

U.S. Appl. No. 13/707,531, filed Dec. 6, 2012.

(Continued)

*Primary Examiner* — John Blanton
(74) *Attorney, Agent, or Firm* — Hartman & Citrin LLC

(57) ABSTRACT

Concepts and technologies are described herein for location-based WI-FI radio activation and deactivation for mobile devices. According to one aspect disclosed herein, a WI-FI connection management system can detect that a mobile device is within a coverage area provided by a WI-FI network. The WI-FI connection management system can also generate a trigger to instruct the mobile device to activate a WI-FI radio of the mobile device and connect to the WI-FI network. The WI-FI connection management system can also send the trigger to the mobile device.

20 Claims, 7 Drawing Sheets

(51) Int. Cl.
*H04W 76/00* (2009.01)
*H04W 76/06* (2009.01)
*H04W 84/04* (2009.01)
*H04W 48/20* (2009.01)

(56) References Cited

U.S. PATENT DOCUMENTS

| | | | |
|---|---|---|---|
| 7,082,305 | B2 | 7/2006 | Willars et al. |
| 7,116,970 | B2 | 10/2006 | Brusilovsky et al. |
| 7,146,130 | B2 | 12/2006 | Hsu et al. |
| 7,400,600 | B2 | 7/2008 | Mullany et al. |
| 7,400,886 | B2 | 7/2008 | Sahim et al. |
| 7,440,755 | B2 | 10/2008 | Balachandran |
| 7,496,060 | B2 | 2/2009 | Ramirez et al. |
| 7,508,781 | B2 | 3/2009 | Liu et al. |
| 7,590,422 | B1 | 9/2009 | Chow et al. |
| 7,653,392 | B2 | 1/2010 | Ovadia et al. |
| 7,680,469 | B2 | 3/2010 | Fry |
| 7,924,787 | B2 | 4/2011 | Lee |
| 7,929,964 | B2 | 4/2011 | Arumi et al. |
| 7,936,708 | B2 | 5/2011 | Kesavan et al. |
| 8,121,090 | B1 | 2/2012 | Dinan et al. |
| 8,121,607 | B2 | 2/2012 | Fang et al. |
| 8,126,461 | B2 | 2/2012 | Sengupta et al. |
| 8,212,661 | B2 | 7/2012 | Shuster |
| 8,254,982 | B2 | 8/2012 | Kuningas |
| 8,270,975 | B2 | 9/2012 | Kim et al. |
| 8,270,991 | B2 | 9/2012 | Zhao |
| 8,271,025 | B2 | 9/2012 | Brisebois et al. |
| 8,279,831 | B2 | 10/2012 | Sengupta et al. |
| 8,280,377 | B2 | 10/2012 | Lee et al. |
| 8,331,228 | B2 | 12/2012 | Huber et al. |
| 8,331,929 | B2 | 12/2012 | Brisebois et al. |
| 8,364,156 | B2 | 1/2013 | Chun et al. |
| 8,385,917 | B2 | 2/2013 | Brisebois |
| 8,391,238 | B2 | 3/2013 | Rune et al. |
| 8,417,823 | B2 | 4/2013 | Luna et al. |
| 8,467,786 | B2 | 6/2013 | Salkintzis |
| 8,488,586 | B2 | 7/2013 | Centonza et al. |
| 8,493,935 | B2 | 7/2013 | Zisimopoulos |
| 8,510,801 | B2 | 8/2013 | Majmundar et al. |
| 8,522,312 | B2 | 8/2013 | Huber et al. |
| 9,008,063 | B2 * | 4/2015 | Cui et al. .................... 370/338 |
| 2002/0123365 | A1 | 9/2002 | Thorson et al. |
| 2003/0078075 | A1 | 4/2003 | Mcnicol |
| 2003/0117953 | A1 | 6/2003 | Kinahan et al. |
| 2007/0091847 | A1 | 4/2007 | Lee |
| 2007/0184835 | A1 | 8/2007 | Bitran et al. |
| 2009/0068970 | A1 | 3/2009 | Ahmed et al. |
| 2009/0088160 | A1 | 4/2009 | Pani et al. |
| 2009/0154423 | A1 | 6/2009 | Song et al. |
| 2009/0164813 | A1 | 6/2009 | Tu et al. |
| 2009/0209263 | A1 | 8/2009 | Breuer et al. |
| 2010/0056181 | A1 | 3/2010 | Rippon et al. |
| 2010/0149971 | A1 | 6/2010 | Noriega |
| 2010/0234021 | A1 | 9/2010 | Ngai et al. |
| 2010/0255849 | A1 | 10/2010 | Ore |
| 2010/0279601 | A1 | 11/2010 | Phan et al. |
| 2010/0296415 | A1 | 11/2010 | Sachs et al. |
| 2010/0296474 | A1 | 11/2010 | Noriega |
| 2011/0070863 | A1 | 3/2011 | Ma et al. |
| 2011/0072101 | A1 | 3/2011 | Forssell et al. |
| 2011/0075557 | A1 | 3/2011 | Chowdhury et al. |
| 2011/0142006 | A1 | 6/2011 | Sachs |
| 2011/0149879 | A1 | 6/2011 | Noriega et al. |
| 2011/0235615 | A1 | 9/2011 | Kalhan |
| 2011/0261695 | A1 | 10/2011 | Zhao et al. |
| 2011/0306386 | A1 | 12/2011 | Centoza et al. |
| 2012/0013504 | A1 | 1/2012 | Raento et al. |
| 2012/0021725 | A1 | 1/2012 | Rune |
| 2012/0258674 | A1 | 10/2012 | Livet et al. |
| 2012/0258715 | A1 | 10/2012 | Souissi et al. |
| 2012/0264412 | A1 | 10/2012 | Tervonen et al. |
| 2012/0275371 | A1 | 11/2012 | Somasundaram et al. |
| 2012/0294293 | A1 | 11/2012 | Kahn et al. |
| 2012/0315905 | A1 | 12/2012 | Zhu et al. |
| 2012/0324100 | A1 | 12/2012 | Tomici et al. |
| 2013/0012182 | A1 | 1/2013 | Liao |
| 2013/0023302 | A1 | 1/2013 | Sivanesan et al. |
| 2013/0029708 | A1 | 1/2013 | Fox et al. |
| 2013/0045740 | A1 | 2/2013 | Gayde et al. |
| 2013/0051379 | A1 | 2/2013 | Wang et al. |
| 2013/0065562 | A1 | 3/2013 | Singh |
| 2013/0065585 | A1 | 3/2013 | Pelletier et al. |
| 2013/0111038 | A1 | 5/2013 | Girard |
| 2013/0121322 | A1 | 5/2013 | Salkintzis |
| 2013/0143526 | A1 | 6/2013 | Kanugovi et al. |
| 2013/0143542 | A1 | 6/2013 | Kovvali et al. |
| 2013/0165131 | A1 | 6/2013 | Garcia Martin et al. |
| 2013/0170351 | A1 | 7/2013 | Reznik et al. |
| 2013/0189996 | A1 | 7/2013 | Sridhar et al. |
| 2013/0208696 | A1 | 8/2013 | Garcia Martin et al. |
| 2013/0230011 | A1 | 9/2013 | Rinne et al. |
| 2013/0308445 | A1 | 11/2013 | Xiang et al. |

FOREIGN PATENT DOCUMENTS

| | | |
|---|---|---|
| EP | 2533571 | 12/2012 |
| EP | 2632072 | 8/2013 |
| EP | 2603046 | 12/2013 |
| WO | WO2012121757 | 9/2012 |
| WO | WO2012149954 | 11/2012 |
| WO | WO2012168152 | 12/2012 |
| WO | WO2013127691 | 9/2013 |

OTHER PUBLICATIONS

U.S. Appl. No. 13/707,551, filed Dec. 6, 2012.
U.S. Appl. No. 13/707,534, filed Dec. 6, 2012.
U.S. Appl. No. 13/707,535, filed Dec. 6, 2012.
U.S. Appl. No. 13/707,538, filed Dec. 6, 2012.
U.S. Appl. No. 13/707,539, filed Dec. 6, 2012.
U.S. Appl. No. 14/064,329, filed Oct. 28, 2013.
U.S. Appl. No. 13/681,141, filed Nov. 19, 2012.
U.S. Appl. No. 13/748,454, filed Jan. 23, 2013.
U.S. Appl. No. 14/035,584, filed Sep. 24, 2013.
U.S. Appl. No. 14/059,401, filed Oct. 21, 2013.
U.S. Appl. No. 14/084,578, filed Nov. 19, 2013.
U.S. Office Action dated Jun. 27, 2012 in U.S. Appl. No. 12/946,611.
U.S. Office Action dated Mar. 22, 2012 in U.S. Appl. No. 12/946,611.
U.S. Notice of Allowance dated Nov. 2, 2012 in U.S. Appl. No. 12/946,611.
U.S. Office Action dated Mar. 13, 2012 in U.S. Appl. No. 12/624,643.
U.S. Notice of Allowance dated Aug. 8, 2012 in U.S. Appl. No. 12/624,643.
U.S. Office Action dated Sep. 13, 2013 in U.S. Appl. No. 13/681,141.
U.S. Office Action dated Apr. 22, 2013 in U.S. Appl. No. 13/681,141.
U.S. Office Action dated Apr. 7, 2014 in U.S. Appl. No. 13/681,141.
U.S. Office Action dated Mar. 12, 2014 in U.S. Appl. No. 13/707,551.
U.S. Office Action dated 06/24/14 in U.S. Appl. No. 13/707,532.
U.S. Notice of Allowance dated Nov. 20, 2014 in U.S. Appl. No. 13/707,532.
Feng, S. et al., "Self-Organizing Networks (SON) in 3GPP Long Term Evolution," Novel Mobile Radio Research, May 20, 2008.
Greenpacket, "Wi-Fi Offload: Authentication and Security Through EAP-Based Approach," Interface, May 2012.
"Universal Mobile Telecommunications System (UMTS); LTE; Access Network Discovery and Selection Function (ANDSF) Management Object (MO)," 3GPP TS 24.312, ETSI TS 124 312 v11.4.0 (Oct. 2012).
Desta Haileselassie Hagos, Rudiger Kapitza, "Study on Performance-Centric Offload Strategies for LTE Networks," TU Braunschweig, Wireless and Mobile Networking Conference (WMNC), 2013 6th Joint IFIP, 2013.
Desta Haileselassie Hagos, "The Performance of WiFi Offload in LTE Networks," Master's Thesis, Lulea University of Technology, Jun. 2012.
Heinonen et al., "Advanced EPC Architecture for Smart Traffic Steering," MEVICO, Nov. 2011.

(56) References Cited

OTHER PUBLICATIONS

ETSI, "Universal Mobile Telecommunications System (UMTS); LTE; Access Network Discovery and Selection Function (ANDSF) Management Object (MO)," Apr. 2013, Version 11.6.0, Release 11, France.
Desh, "15 Cellphone chargers that harness kinetic energy for a clean recharge". Copyright Instablogs Network 2009. http://www.greendiary.com/entry/15-cellphone-chargers-that-harness-kinetic-energy-for-a-clean-recharge/ Last accessed Feb. 15, 2011, 10 pages.
Nicole Casal Moore, "Tiny Generators run on good vibrations". Copyright 2009-2011 Futurity.org. http://www.futurity.org/science-technology/tiny-generators-run-on-good-vibrations/ Last accessed Feb. 15, 2011, 5 pages.
Noel McKeegan, "Good vibrations: tiny generator harnesses kinetic energy to power wireless electrical systems". Copyright gizmag 2003-2011. http://www.gizmag.com/go/7584/ Last accessed Feb. 15, 2011, 4 pages.
S.P. Beeby, et al., "Kinetic Energy Harvesting". ACT Workshop on Innovative Concepts. ESA-ESTEC Jan. 28-29, 2008. http://www.esa.int/gsp/ACT/events/workshops/ACT-ART-Bridge2Space-Beeby.pdf Last accessed Feb. 15, 2011, 10 pages.
"Directory:Human-Powered". http://peswiki.com/index.php/Directory:Human-Powered Last accessed Feb. 15, 2011, 11 pages.
Alkhawlani et al., "Intelligent radio network selection for next generation networks," Informatics and Systems (INFOS), 2010 The 7th International Conference on, 2010, pp. 1, 7, 28-30.
Changqing et al., "Optimal Channel Access for TCP Performance Improvement in Cognitive Radio Networks: A Cross-Layer Design Approach," Global Telecommunications Conference, 2009. GLOBECOM 2009. IEEE, 2009, pp. 1, 6.
Samdanis et al., "Traffic Offload Enhancements for eUTRAN," Communications Surveys & Tutorials, IEEE, 2012, vol. 14, No. 3, pp. 884,896.
Watanabe et al., "Radio network selection scheme notified by the each network's real-time performance in the multi-layered communication network," Wireless Personal Multimedia Communications (WPMC), 2012 15th International Symposium on, 2012, pp. 169, 171, 24-27.
Kwon et al., "Load Based Cell Selection Algorithm for Faulted Handover in Indoor Femtocell Network," Vehicular Technology Conference (VTC Spring), 2011 IEEE 73rd, 2011, pp. 1, 5, 15-18.
Wei et al., "A mobility load balancing optimization method for hybrid architecture in self-organizing network," Communication Technology and Application (ICCTA 2011), IET International Conference on, 2011, pp. 828, 832.
"Macro to small cell, metro cell Hand-in" Alcatel-Lucent, AT&T R3-112026 http://www.3gpp.org/ftp/Specs/html-info/TDocExMtg--R3-73--28511.htm.
Stemm, Mark, and Randy H. Katz. "Vertical handoffs in wireless overlay networks." Mobile Networks and applications 3.4 (1998): 335-350. http://morse.colorado.edu/~timxb/5520/ho/8.pdf.
Chiu, Ming-Hsing, and Mostafa A. Bassiouni. "Predictive schemes for handoff prioritization in cellular networks based on mobile positioning." Selected Areas in Communications, IEEE Journal on 18.3 (2000): 510-522. http://dx.doi.org/10.1109/49.840208.
Soh, Wee-Seng, and Hyong S. Kim. "QoS provisioning in cellular networks based on mobility prediction techniques." Communications Magazine, IEEE 41.1 (2003): 86-92. http://citeseerx.ist.psu.edu/viewdoc/download?doi=10.1.1.98.2622&rep=rep1&type=pdf.
Pollini, Gregory P. "Trends in handover design." Communications Magazine, IEEE 34.3 (1996): 82-90. http://inrg.csie.ntu.edu.tw/course/wms/paper/Pollin96.pdf.

* cited by examiner

LOCATION-BASED WI-FI RADIO ACTIVATION AND DEACTIVATION FOR MOBILE DEVICES

CROSS-REFERENCE TO RELATED APPLICATION

This application is a continuation of U.S. Patent Application No. 13/707,532, filed Dec. 6, 2012, now U.S. Pat. No. 9,008,063, which is incorporated by reference herein in its entirety.

TECHNICAL FIELD

The concepts and technologies disclosed herein generally relate to wireless telecommunications. More specifically, the concepts and technologies disclosed herein relate to location-based WI-FI radio activation and deactivation for mobile devices.

BACKGROUND

In recent years, mobile telecommunications carriers have experienced a dramatic increase in traffic on their networks, and this trend will likely continue. This increase in traffic has been caused in part by the increased adoption of smartphones and other devices that rely on mobile telecommunications networks, and the migration of many customers from utilizing landline telecommunication services to utilizing mobile telecommunication services for their communications needs. To meet the demands of higher traffic and to improve the end user experience, mobile telecommunications carriers are examining mechanisms by which to improve network efficiency, network capacity, and the end user experience, while keeping operational costs at a level conducive to maintaining competitive rates for the services they provide.

SUMMARY

Concepts and technologies are described herein for location-based WI-FI radio activation and deactivation for mobile devices. According to one aspect disclosed herein, a WI-FI connection management system can include a processor and a memory in communication with the processor. The memory can include computer-executable instructions that, when executed by the processor, cause the processor to perform operations, which can include detecting that a mobile device is within a coverage area provided by a WI-FI network, generating a trigger to instruct the mobile device to activate a WI-FI radio of the mobile device and connect to the WI-FI network, and sending the trigger to the mobile device.

In some embodiments, the operations can also include detecting that the mobile device is outside of the coverage area provided by the WI-FI network, generating a second trigger to instruct the mobile device to deactivate the WI-FI radio of the mobile device, and sending the second trigger to the mobile device.

In some embodiments, the operations can also include requesting authentication credentials from a WI-FI authentication server and receiving the authentication credentials from the WI-FI authentication server. In these embodiments, the trigger can also instruct the mobile device to connect to the WI-FI network utilizing the authentication credentials received from the WI-FI authentication server.

In some embodiments, the operations can also include instructing a WI-FI authentication server to negotiate a secure connection to the WI-FI network when the mobile device attempts to connect to the WI-FI network.

In some embodiments, the WI-FI network is operated by a mobile telecommunications carrier that operates a mobile telecommunications network that the mobile device is capable of connecting to. In these embodiments, the trigger can also instruct the mobile device to deactivate a cellular radio configured to connect the mobile device to the mobile telecommunications network. In some embodiments, the operations can also include detecting that the mobile device is outside of the coverage area provided by the WI-FI network, generating a second trigger to instruct the mobile device to deactivate the WI-FI radio of the mobile device and to reactivate the cellular radio of the mobile device, and sending the second trigger to the mobile device.

According to another aspect disclosed herein, a method can include a WI-FI connection management system detecting that a mobile device is within a coverage area provided by a WI-FI network, generating a trigger to instruct the mobile device to activate a WI-FI radio of the mobile device and connect to the WI-FI network, and sending the trigger to the mobile device.

In some embodiments, the method can also include the WI-FI connection management system detecting that the mobile device is outside of the coverage area provided by the WI-FI network, generating a second trigger to instruct the mobile device to deactivate the WI-FI radio of the mobile device, and sending the second trigger to the mobile device.

In some embodiments, the method can also include requesting authentication credentials from a WI-FI authentication server and receiving the authentication credentials from the WI-FI authentication server. In these embodiments, the trigger can also instruct the mobile device to connect to the WI-FI network utilizing the authentication credentials received from the WI-FI authentication server. Alternatively, the mobile device can connect to the WI-FI network utilizing locally stored authentication credentials. The locally stored authentication credentials may be stored on a memory of the mobile device and/or on a subscriber identity module ("SIM"), for example.

In some embodiments, the method can also include instructing a WI-FI authentication server to negotiate a secure connection to the WI-FI network when the mobile device attempts to connect to the WI-FI network.

In some embodiments, the WI-FI network is operated by a mobile telecommunications carrier that operates a mobile telecommunications network that the mobile device is capable of connecting to. In these embodiments, the trigger can also instruct the mobile device to deactivate a cellular radio configured to connect the mobile device to the mobile telecommunications network. In some embodiments, the method can also include the WI-FI connection management system detecting that the mobile device is outside of the coverage area provided by the WI-FI network, generating a second trigger to instruct the mobile device to deactivate the WI-FI radio of the mobile device and to reactivate the cellular radio of the mobile device, and sending the second trigger to the mobile device.

According to another aspect disclosed herein, a mobile device can include a cellular radio, a WI-FI radio, a processor, and a memory in communication with the processor. The memory can include computer-executable instructions that, when executed by the processor, cause the processor to perform operations, which can include receiving a trigger from a WI-FI connection management system. The trigger can include instructions from the WI-FI connection management system or from a mobile telecommunications network to activate the WI-FI radio and connect to a WI-FI network. The operations can also include activating the WI-FI radio per the instructions included in the trigger and connecting to the WI-FI network per the instructions included in the trigger.

In some embodiments, the mobile device receives the trigger in response to the mobile device being within a coverage area provided by the WI-FI network.

In some embodiments, the operations can also include, in response to the mobile device being outside of the coverage area provided by the WI-FI network, receiving a second trigger from the WI-FI connection management system. The second trigger can include instructions from the WI-FI connection management system to deactivate the WI-FI radio of the mobile device. In these embodiments, the operations can also include deactivating the WI-FI radio per the instructions included in the second trigger.

In some embodiments, the trigger also includes authentication credentials to be utilized by the mobile device in establishing a connection to the WI-FI network.

In some embodiments, the operation for connecting to the WI-FI network per the instructions included in the trigger can include attempting to connect to the WI-FI network, negotiating a secure connection to the WI-FI network with a WI-FI authentication server, and connecting to the WI-FI network utilizing authentication credentials obtained through the negotiation.

In some embodiments, the WI-FI network is operated by a mobile telecommunications carrier that operates a mobile telecommunications network that the mobile device is capable of connecting to. In these embodiments, the operations can also include, in response to the mobile device being outside of the coverage area provided by the WI-FI network, receiving a second trigger from the WI-FI connection management system or from the mobile telecommunications network. The second trigger can include instructions from the WI-FI connection management system to deactivate the WI-FI radio of the mobile device and reactivate the cellular radio. The operations can also include deactivating the WI-FI radio per the instructions included in the second trigger and reactivating the cellular radio per the instructions included in the second trigger.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
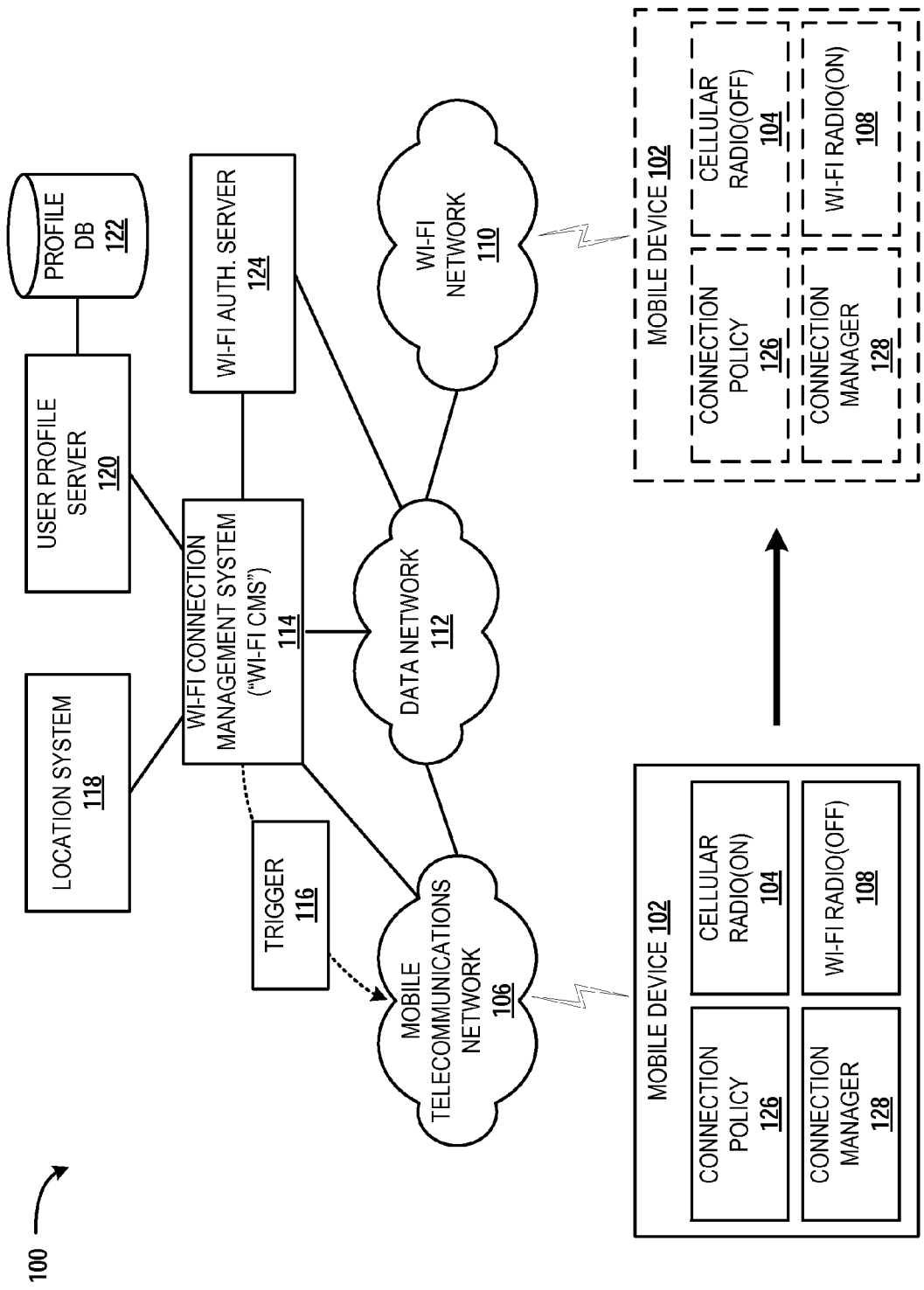
FIG. 1 is a block diagram illustrating aspects of an illustrative operating environment for various concepts disclosed herein.

Concepts and technologies are disclosed herein for location-based WI-FI radio activation and deactivation for mobile devices. According to one aspect disclosed herein, a location of a mobile device is used to trigger activation or deactivation of a WI-FI radio of the mobile device. Utilizing such a trigger, a mobile telecommunications carrier can direct the mobile device to connect to a WI-FI network, which may be owned and/or operated by the mobile telecommunications carrier. In this manner, the mobile telecommunications carrier can conserve network resources of a mobile telecommunications network and/or provide a better user experience to the user of the mobile device.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of location-based WI-FI radio activation and deactivation for mobile devices will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a mobile device 102. The mobile device 102 may be a cellular telephone, a smartphone, a mobile computer, a tablet computer, or the like. In the illustrated embodiment, the mobile device 102 includes a cellular radio 104 that facilitates wireless communication over a radio/air interface with a mobile telecommunications network 106. The illustrated mobile device 102 also includes a WI-FI radio 108 that facilitates wireless communication over a radio/air interface with a WI-FI network 110.

The mobile telecommunications network 106 includes one or more radio access networks ("RANs"). The mobile telecommunications network 106 can also include a wireless wide area network ("WWAN"), which may, in turn, include a circuit-switched core network ("CS CN"), a packet-switched core network ("PS CN"), and/or an IP multimedia subsystem ("IMS") core network. The WWAN can utilize one or more mobile telecommunications technology standards to provide voice and/or data services via one or more RANs to a WWAN component of the mobile device 102 such as the cellular radio 104. The mobile telecommunications technology standards may include, but are not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), and/or the like.

A RAN can utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and/or the like to provide an air interface to the mobile device 102. A RAN may be a GSM RAN ("GRAN"), a GSM EDGE RAN ("GERAN"), a UMTS Terrestrial Radio Access Network ("UTRAN"), an E-UTRAN, any combination thereof, and/or the like. The mobile device 102 can communicate with one or more RANs that utilize the same or different radio access technologies. As such, in some embodiments, the mobile device 102 is a multi-mode communications device.

Data communications can be provided by the mobile telecommunications network 106 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access standards. The mobile telecommunications network 106 may be configured to provide voice and/or data communications with any combination of the above technologies. The mobile telecommunications network 106 may be configured to or adapted to provide voice and/or data communications in accordance with future generation technologies. The mobile device 102 may also initiate, receive, and/or maintain voice calls with one or more other devices (not shown). The mobile device 102 may also exchange Short Message Service ("SMS") messages, email, and/or other messages with other devices.

The mobile telecommunications network 106 may be owned and/or operated by one or more mobile telecommunications carriers. In some implementations, the mobile telecommunications network 106 includes a mobile telecommunications carrier's network and one or more partner networks, such as networks owned and/or operated by one or more roaming partners of the mobile telecommunications carrier.

The WI-FI network 110 may operate in accordance with one or more Institute of Electrical and Electronic Engineers ("IEEE") 802.11 standards such as IEEE 802.11a, 802.11b, 802.11g, 802.11n, and/or future 802.11 standard (referred to herein collectively as "WI-FI"). Draft 802.11 standards are also contemplated. The WI-FI network 110 can include one or more access points that provide a radio/air interface over which the mobile device 102 can send and/or receive data. In some implementations, an access point is a mobile device or other computing device that functions as a WI-FI hotspot. In some implementations, the mobile device 102 is configured to connect to the WI-FI network 110 via one or more secure connections, each of which may utilize an encryption technology such as, but not limited to, WI-FI Protected Access ("WPA"), WPA2, Wired Equivalent Privacy ("WEP"), and/or the like.

In some embodiments, the WI-FI network 110 is owned and/or operated by a mobile telecommunications carrier, which may be the same mobile telecommunications carrier that owns and/or operates the mobile telecommunications network 106. The mobile telecommunications carrier may partner with one or more businesses and/or other entities to provide one or more WI-FI access points in locations used to facilitate access to the WI-FI network 110 by mobile devices, such as the mobile device 102. In some other embodiments, the WI-FI network 110 is a WI-FI network operated by or for a business or other entity (e.g., a municipality) without the involvement of a mobile telecommunications carrier. In some other embodiments, the WI-FI network 110 is a user WI-FI network. For example, the WI-FI network 110 may be a WI-FI network 110 setup using one or more WI-FI routers in a home, workplace, or other location of a user of the mobile device 102.

The mobile device 102 can communicate with the mobile telecommunications network 106 and/or the WI-FI network 110 to access a data network 112. The data network 112 can be or can include a packet data network ("PDN"), an internet, the Internet, an intranet, some combination thereof, and/or the like. The mobile device 102 can access the data network 112 via the mobile telecommunications network 106 and/or the WI-FI network 110 to access content such as Websites, streaming media, online video games, downloadable content, and the like. The mobile device 102 can access the data network 112 via the mobile telecommunications network 106 and/or the WI-FI network 110 to conduct voice over Internet protocol ("VoIP") calls, engage in messaging services, or engage in other communication services provided at least in part via the data network 112.

The mobile device 102 is illustrated in duplication to show the connectivity of the mobile device 102 to both the mobile telecommunications network 106 and the WI-FI network 110. In some implementations, the mobile telecommunications network 106 has a coverage area that encompasses at least a portion of the WI-FI network 110. The mobile device 102 therefore can be simultaneously connected to the mobile telecommunications network 106 and the WI-FI network 110. In the illustrated example, however, the mobile device 102 communicates with the mobile telecommunications network 106 via the cellular radio 104 in an activated or "ON" state, while the WI-FI radio 108 is in a deactivated or "OFF" state. Similarly, the mobile device 102 communicates with the WI-FI network 110 via the WI-FI radio 108 in an activated or "ON" state, while the cellular radio 104 is in a deactivated or "OFF" state. The activation or deactivation of the cellular radio 104 and/or the WI-FI radio 108 can be managed by or for a mobile telecommunications carrier that owns and/or operates the mobile telecommunications network 106. In this manner, the mobile telecommunications carrier can steer the mobile device 102 to connect to the WI-FI network 110 so as to conserve resources of the mobile telecommunications network 106. The selective activation and deactivation of the cellular radio 104 and/or the WI-FI radio 108 can also increase battery life of the mobile device 102.

Although the cellular radio 104 is shown as being in a deactivated or "OFF" state when connected to the WI-FI network 110, the cellular radio 104 alternatively may be in a low-power state in which the cellular radio 104 consumes less power than when in the activated or "ON" state, but more power than when in the deactivated or "OFF" state. Alternatively, the cellular radio 104 may be in an activated or "ON" state when connected to the WI-FI network 110. In this implementation, the mobile device 102 can send and/or receive voice calls or other non-data communications via a connection to the mobile telecommunications network 106 provided by the cellular radio 104, and conduct data communications such as Web browsing, music or video streaming, or the like via a connection to the WI-FI network 110 provided by the WI-FI radio 108.

The operating environment 100 also includes a WI-FI connection management system 114 (hereinafter "WI-FI CMS" in the drawings). The WI-FI connection management system 114 can communicate with the mobile telecommunications network 106 to provide instructions regarding whether or not the mobile device 102 should activate or deactivate the cellular radio 104 and/or the WI-FI radio 108. For example, when the mobile device 102 enters a coverage area provided by the WI-FI network 110, the WI-FI connection management system 114 can generate a trigger 116 that includes instructions useable by the mobile device 102 to activate the WI-FI radio 108, and send the trigger 116 to the mobile device 102 so as to instruct the mobile device 102 to activate the WI-FI radio 108. These instructions may additionally include instructions useable by the mobile device 102 to deactivate the cellular radio 104 or put the cellular radio 104 into another state such as a low-power state.

In some embodiments, the WI-FI connection management system 114 detects a utilization load of the WI-FI network 110. For example, one or more access points operating within the WI-FI network 110 can provide utilization load information to the WI-FI connection management system 114 upon request from the WI-FI connection management system 114 or periodically. The WI-FI connection management system 114 can determine if the WI-FI network 110 is congested based, at least in part, upon the utilization load. For example, the WI-FI connection management system 114 can maintain threshold parameters for when the WI-FI network 110 should be considered to be congested and when the WI-FI network 110 should be considered to be not congested. The WI-FI connection management system 114 generates the trigger 116 that includes instructions useable by the mobile device 102 to avoid turning on the WI-FI radio 108 even though the mobile device 102 is within the coverage of the WI-FI network 110.

Similarly, when the mobile device 102 leaves a coverage area provided by the WI-FI network 110, the WI-FI connection management system 114 can generate a trigger 116 that includes instructions useable by the mobile device 102 to deactivate the WI-FI radio 108, and send the trigger 116 to the mobile device 102 so as to instruct the mobile device 102 to deactivate the WI-FI radio 108. These instructions may additionally include instructions useable by the mobile device 102 to reactivate the cellular radio 104 or return the cellular radio 104 to an activated or "ON" state from a low-power or other state. Alternatively, when the mobile device 102 leaves a coverage area provided by the WI-FI network 110, the mobile device 102 can automatically deactivate the WI-FI radio 108 in response to a signal received from the WI-FI network 110 that is of a signal strength that at least meets a minimum signal strength threshold, or if no signal is received by the WI-FI radio 108.

The WI-FI connection management system 114 can generate the trigger 116 in response to knowledge of the location of the mobile device 102 being a location served by the WI-FI network 110. The WI-FI connection management system 114 can receive location information, such as latitude/longitude coordinate, cell identity ("CID"), location area identity ("LAI"), physical cell identity ("PCI"), triangulation data, or the like, from a location system 118. In some embodiments, the location system 118 is a mobile location center ("MLC") operating in a serving or gateway capacity. Moreover, the location system 118 may include multiple MLCs, location registers, and/or other network elements to ascertain the location of the mobile device 102. As such, although the location system 118 is illustrated as being external to the mobile telecommunications network 106, the location system 118 may be part of the mobile telecommunications network 106. The WI-FI connection management system 114 may also be part of the mobile telecommunications network 106 or may be external to the mobile telecommunications network 106 as shown.

As an alternative to location information received from the location system 118, the WI-FI connection management system 114 can request and receive location information from the mobile device 102. In such implementations, the mobile device 102 can utilize a Global Positioning System ("GPS"), the cellular radio 104, and/or the WI-FI radio 108 to ascertain the location of the mobile device 102 utilizing GPS, cellular triangulation, and/or WI-FI triangulation techniques, and provide the location to the WI-FI connection management system 114 in response to the request received therefrom. In other embodiments, the mobile device 102 can provide the location to the WI-FI connection management system 114 periodically, or when the cellular radio 104 and/or the WI-FI radio 108 detects one or more signals originating from the WI-FI network 110.

The illustrated WI-FI connection management system 114 is also in communication with a user profile server 120, which, in turn, is in communication with a user profile database 122. The user profile server 120 can be configured to provide user profiles, including a user profile of a user of the mobile device 102, to the WI-FI connection management system 114 for use in generating the trigger 116 to selectively activate or deactivate the cellular radio 104 and/or the WI-FI radio 108. As used herein, the term "user profile" refers to a collection of data associated with a user that accesses the mobile telecommunications network 106 via a device such as the mobile device 102. A user in this context refers to an individual or other entity. In some embodiments, a user profile includes information regarding a service agreement between a user and a mobile telecommunications carrier that provides a service, at least in part, via the mobile telecommunications network 106 and/or the WI-FI network 110. In some embodiments, a user profile includes WI-FI network access information such as a service set identifier ("SSID") and, if applicable, authentication credentials for one or more WI-FI networks, such as the WI-FI network 110. The authentication credentials can include, for example, user name, password, encryption key, combination thereof, and/or the like. It is contemplated that a user profile can be updated as the mobile device 102 connects to new WI-FI networks 110. As such, the WI-FI connection management system 114 can have knowledge of one or more WI-FI networks that the mobile device 102 has been connected to.

The illustrated WI-FI connection management system 114 is also in communication with a WI-FI authentication server 124. In some embodiments, the WI-FI authentication server 124 is configured to provide authentication credentials to users that have subscribed to or otherwise are authorized to access services provided by a mobile telecommunications carrier that owns and/or operates the mobile telecommunications network 106 and the WI-FI network 110. In some embodiments, the WI-FI authentication server 124 can provide authentication credentials to the WI-FI connection management system 114 for inclusion in the trigger 116. In this manner, the mobile device 102 can receive the trigger 116 that includes instructions to activate the WI-FI radio 108 and connect to the WI-FI network 110 utilizing the authentication credentials provided by the WI-FI authentication server 124. In some other embodiments, the WI-FI connection management system 114 can instruct the WI-FI authentication server 124 to negotiate a secure connection to the WI-FI network 110 when the mobile device 102 attempts to connect to the WI-FI network 110 after activating the WI-FI radio 108 in response to the trigger 116.

As explained above, the WI-FI network 110 may be owned and/or operated by the same mobile telecommunications carrier that owns and/or operates the mobile telecommunications network 106. In some embodiments, the mobile device 102 is configured to activate or deactivate the WI-FI radio 108 and/or the cellular radio 104 in response to detecting the WI-FI network 110 based upon a connection policy 126 stored on the mobile device 102. For example, the connection policy 126 may specify the SSID and, if required, the authentication credentials for accessing the WI-FI network 110. When the mobile device 102 detects the WI-FI network 110, the mobile device 102 can activate the WI-FI radio 108 based upon the connection policy 126.

The illustrated mobile device 102 also includes a connection manager 128. The connection manager 128 can be configured to manage all or a portion of the network connections available to the mobile device 102 at a given time, including, for example, connections that can be established via the cellular radio 104 or the WI-FI radio 108. In some embodiments, the network connection manager 128 is included as part of an operating system (not shown) of the mobile device 102 and/or another application stored on the mobile device 102.

It should be understood that some implementations of the operating environment 100 include multiple mobile devices 102, multiple mobile telecommunications networks 106, multiple WI-FI networks 110, multiple data networks 112, multiple WI-FI connection management systems 114, multiple location systems 118, multiple user profile servers 120, multiple profile databases 122, and/or multiple WI-FI authentication servers 124. It also should be understood that some implementations of the mobile device 102 include multiple cellular radios 104, multiple WI-FI radios 108, multiple connection policies 126, and/or multiple connection managers 128. Thus, the illustrated embodiment should be understood as being illustrative, and should not be construed as being limiting in any way.

Figure 2:
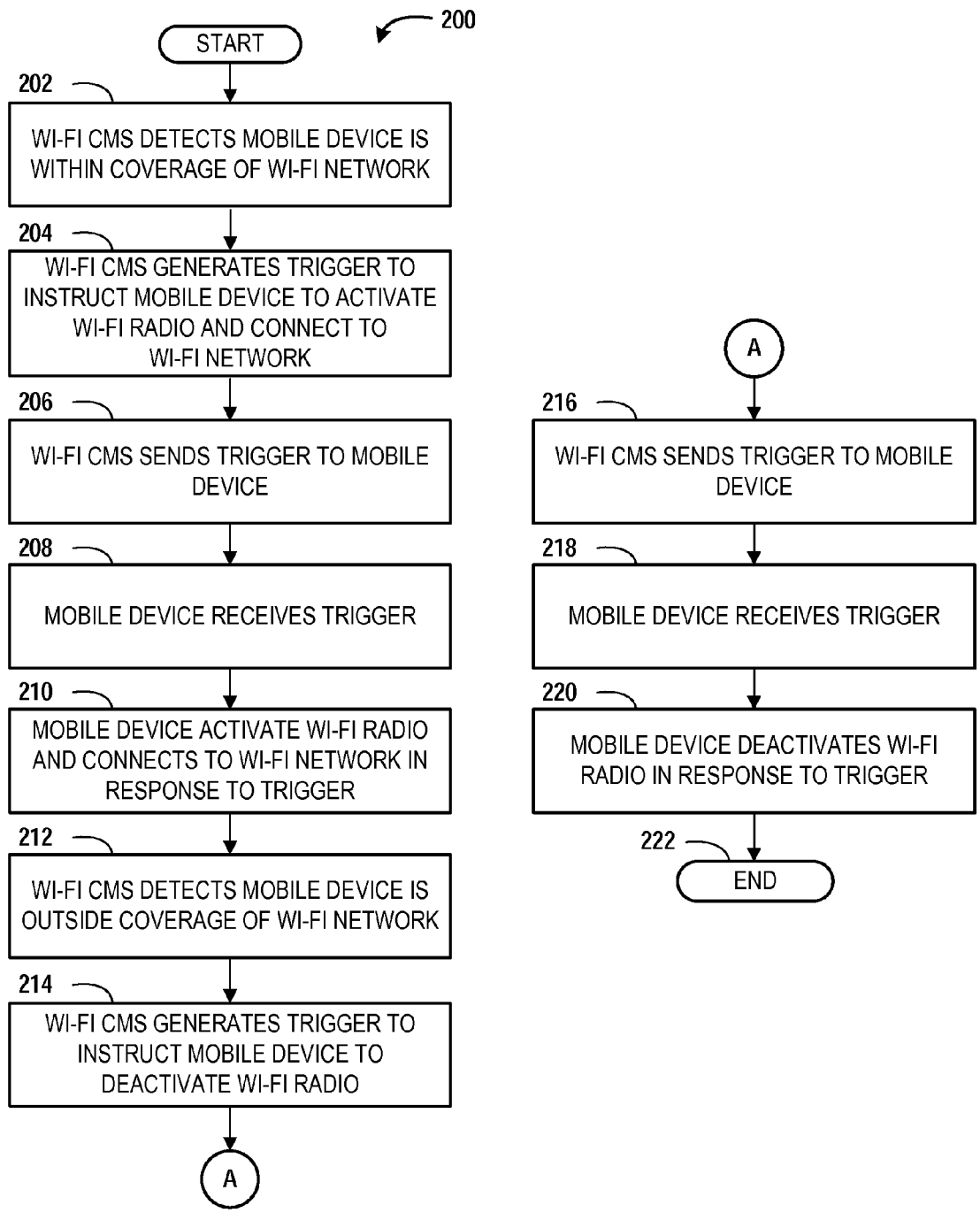
FIG. 2 is a flow diagram illustrating aspects of a method for triggering activation of a WI-FI radio of a mobile device, according to an illustrative embodiment.

Turning now to FIG. 2, a flow diagram illustrating aspects of a method 200 for triggering activation of a WI-FI radio of a mobile device will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multiprocessor systems, distributed computing systems, minicomputers, mainframe computers, personal computers, hand-held computing devices, microprocessor-based, programmable consumer electronics, combinations thereof, and the like. As used herein, "cause a processor to perform operations" includes causing a processor of a computing system or computing device, such as the mobile device 102, the WI-FI connection management system 114, the location system 118, the user profile server 120, or the WI-FI authentication server 124, to perform one or more operations of the operations and/or causing the processor to direct other components of the computing system or computing device to perform one or more of the operations.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 begins and proceeds to operation 202, wherein the WI-FI connection management system 114 detects that the mobile device 102 is within a coverage area provided by the WI-FI network 110. The WI-FI connection management system 114 can receive location information from the location system 118 and/or directly from the mobile device 102 and can utilize the location information to determine if the location of the mobile device 102 is within a coverage area provided by the WI-FI network 110. From operation 202, the method 200 proceeds to operation 204, wherein the WI-FI connection management system 114 generates the trigger 116 to instruct the mobile device 102 to activate (e.g., turn ON) the WI-FI radio 108 and connect to the WI-FI network 110. From operation 204, the method 200 proceeds to operation 206, wherein the WI-FI connection management system 114 sends the trigger 116 to the mobile device 102.

From operation 206, the method 200 proceeds to operation 208, wherein the mobile device 102 receives the trigger 116. From operation 208, the method 200 proceeds to operation 210, wherein, in response to receiving the trigger 116, the mobile device 102 activates (e.g., turns ON) the WI-FI radio 108 and connects to the WI-FI network 110.

From operation 210, the method 200 proceeds to operation 212, wherein the WI-FI connection management system 114 detects that the mobile device 102 is outside of the coverage of the WI-FI network 110. The WI-FI connection management system 114 can receive location information from the location system 118 and/or directly from the mobile device 102 and can utilize the location information to determine if the location of the mobile device 102 is outside of the coverage area provided by the WI-FI network 110. From operation 212, the method 200 proceeds to operation 214, wherein the WI-FI connection management system 114 generates the trigger 116 to instruct the mobile device 102 to deactivate (e.g., turn OFF) the WI-FI radio 108. From operation 214, the method 200 proceeds to operation 216, wherein the WI-FI connection management system 114 sends the trigger 116 to the mobile device 102.

From operation 216, the method 200 proceeds to operation 218, wherein the mobile device 102 receives the trigger 116. From operation 218, the method 200 proceeds to operation 220, wherein, in response to the trigger 116, the mobile device 102 deactivates (e.g., turns OFF) the WI-FI radio 108. Alternatively, the WI-FI radio 108 can detect signal strength from the WI-FI network 110 that at least meets a minimum signal strength threshold or can detect no signal from the WI-FI network 110 and, accordingly, can deactivate the WI-FI radio 108 without the trigger 116 from the WI-FI connection management system 114. From operation 220, the method 200 proceeds to operation 222, wherein the method 200 may end.

Figure 3:
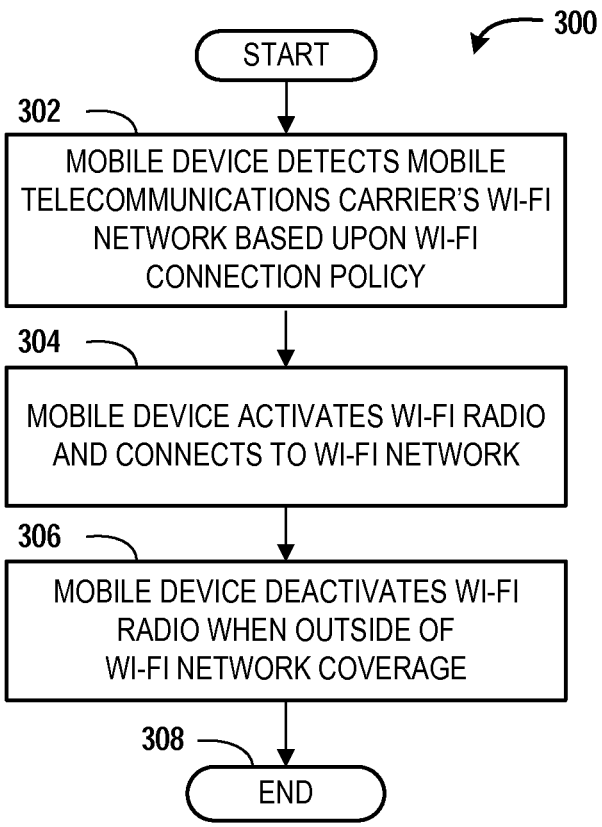
FIG. 3 is a flow diagram illustrating aspects of a method for activating and deactivating a WI-FI radio of a mobile device based upon a WI-FI connection policy, according to an illustrative embodiment.

Turning now to FIG. 3, a method 300 for triggering activation of a WI-FI radio of a mobile device based upon a WI-FI connection policy will be described, according to an illustrative embodiment. The method 300 begins and proceeds to operation 302, wherein the mobile device 102 detects a mobile telecommunications carrier's WI-FI network based upon the connection policy 126. For example, the cellular radio 104 or the WI-FI radio in a low-power or otherwise not fully activated state can detect the presence of one or more signals from the WI-FI network 110, which is known to the mobile device 102 as being provided at least in part by a mobile telecommunications carrier per the connection policy 126. The WI-FI network 110 can be identified, for example, by an SSID or other network identifier.

From operation 302, the method 300 proceeds to operation 304, wherein the mobile device 102 activates (e.g., turns ON) the WI-FI radio 108 and connects to the WI-FI network 110 in accordance with the connection policy 126. In some embodiments, the connection policy 126 identifies the WI-FI network 110 via an SSID or other network identifier as mentioned above, and provides authentication credentials such as user name and password for connecting to the WI-FI network 110. The user name and password can be provided by the mobile telecommunications carrier that owns and/or operates the WI-FI network 110. Moreover, authentication credentials may be provided to the mobile device 102 in the connection policy 126 in accordance with a service agreement between a user of the mobile device 102 and the mobile telecommunications carrier. In this manner, the mobile telecommunications carrier can offer data access via one or more WI-FI networks, thereby improving the overall data coverage offered by the mobile telecommunications carrier.

From operation 304, the method 300 proceeds to operation 306, wherein the mobile device 102 deactivates (e.g., turns OFF) the WI-FI radio 108 when the mobile device 102 is outside of the coverage area provided by the WI-FI network 110. For example, the WI-FI radio 108 can detect signal strength from the WI-FI network 110 that at least meets a minimum signal strength threshold or can detect no signal from the WI-FI network 110 and, accordingly, can deactivate the WI-FI radio 108. From operation 306, the method 300 proceeds to operation 308, wherein the method 300 may end.

Figure 4:
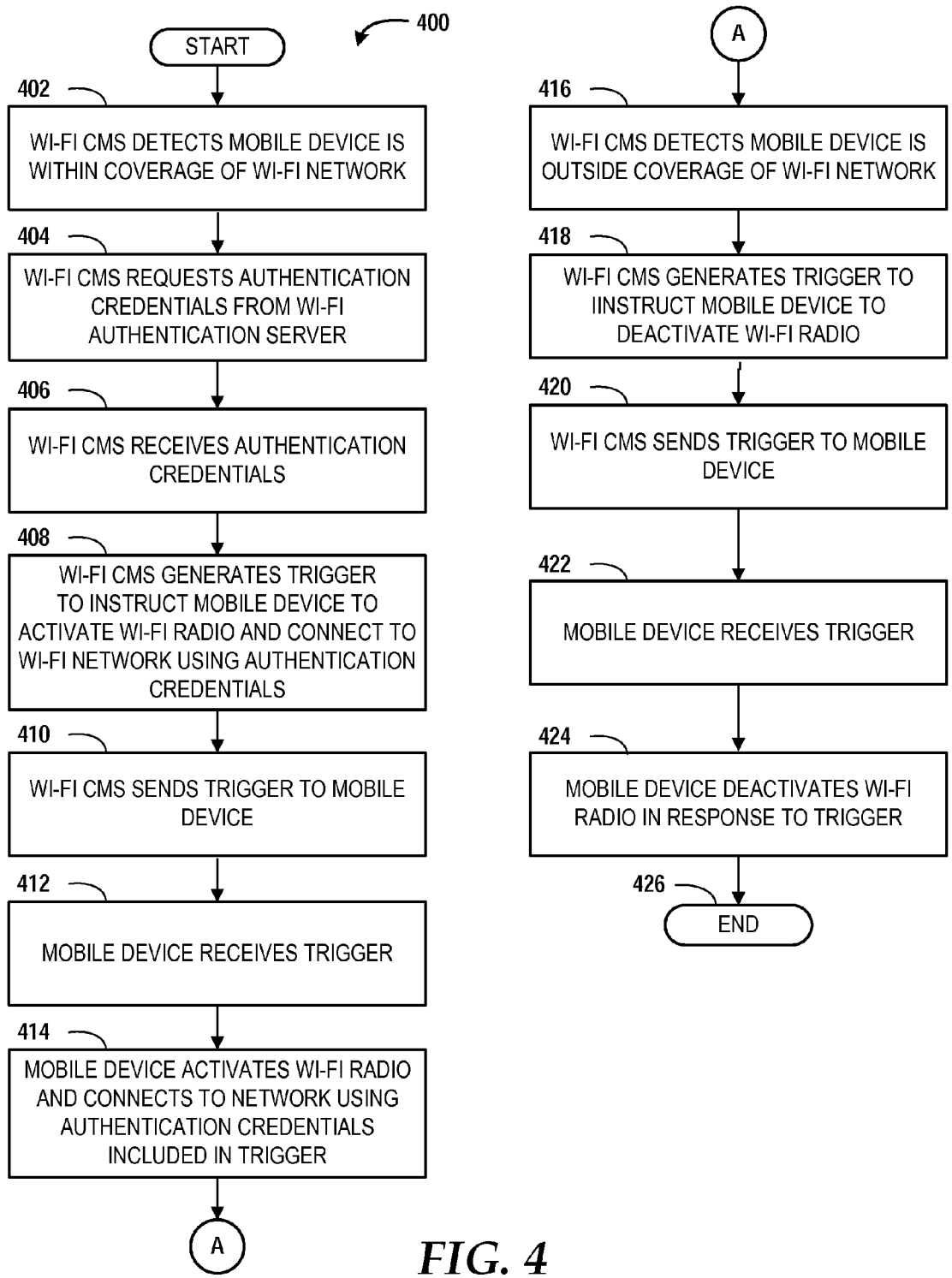
FIG. 4 is a flow diagram illustrating aspects of a method for triggering activation and deactivation of a WI-FI radio of a mobile device, according to an illustrative embodiment.

Turning now to FIG. 4, a method 400 for triggering activation and deactivation of a WI-FI radio of a mobile device will be described, according to an illustrative embodiment. The method 400 begins and proceeds to operation 402, wherein the WI-FI connection management system 114 detects the mobile device 102 is within a coverage area provided by the WI-FI network 110. The WI-FI connection management system 114 can receive location information from the location system 118 and/or directly from the mobile device 102 and can utilize the location information to determine if the location of the mobile device 102 is within a coverage area provided by the WI-FI network 110. From operation 402, the method 400 proceeds to operation 404, wherein the WI-FI connection management system 114 requests, from the WI-FI authentication server 124, authentication credentials for accessing the WI-FI network 110. From operation 404, the method 400 proceeds to operation 406, wherein the WI-FI connection management system 114 receives the requested authentication credentials from the WI-FI authentication server 124. From operation 406, the method 400 proceeds to operation 408, wherein the WI-FI connection management system 114 generates the trigger 116 to instruct the mobile device 102 to activate the WI-FI radio 108 and connect to the WI-FI network 110 using the authentication credentials. From operation 408, the method 400 proceeds to operation 410, wherein the WI-FI connection management system 114 sends the trigger 116 to the mobile device 102.

From operation 410, the method 400 proceeds to operation 412, wherein the mobile device 102 receives the trigger 116. From operation 412, the method 400 proceeds to operation 414, wherein, in response to receiving the trigger 116, the mobile device 102 activates (e.g., turns ON) the WI-FI radio 108 and connects to the WI-FI network 110 using the authentication credentials included in the trigger 116.

From operation 414, the method 400 proceeds to operation 416, wherein the WI-FI connection management system 114 detects that the mobile device 102 is outside of the coverage of the WI-FI network 110. The WI-FI connection management system 114 can receive location information from the location system 118 and/or directly from the mobile device 102 and can utilize the location information to determine if the location of the mobile device 102 is outside of the coverage area provided by the WI-FI network 110. From operation 416, the method 400 proceeds to operation 418, wherein the WI-FI connection management system 114 generates the trigger 116 to instruct the mobile device 102 to deactivate (e.g., turn OFF) the WI-FI radio 108. From operation 418, the method 400 proceeds to operation 420, wherein the WI-FI connection management system 114 sends the trigger 116 to the mobile device 102.

From operation 420, the method 400 proceeds to operation 422, wherein the mobile device 102 receives the trigger 116. From operation 422, the method 400 proceeds to operation 424, wherein, in response to receiving the trigger 116, the mobile device 102 deactivates (e.g., turns OFF) the WI-FI radio 108. Alternatively, the WI-FI radio 108 can detect signal strength from the WI-FI network 110 that at least meets a minimum signal strength threshold or can detect no signal from the WI-FI network 110 and, accordingly, can deactivate the WI-FI radio 108 without the trigger 116 from the WI-FI connection management system 114. From operation 424, the method 400 proceeds to operation 426, wherein the method 400 may end.

Figure 5:
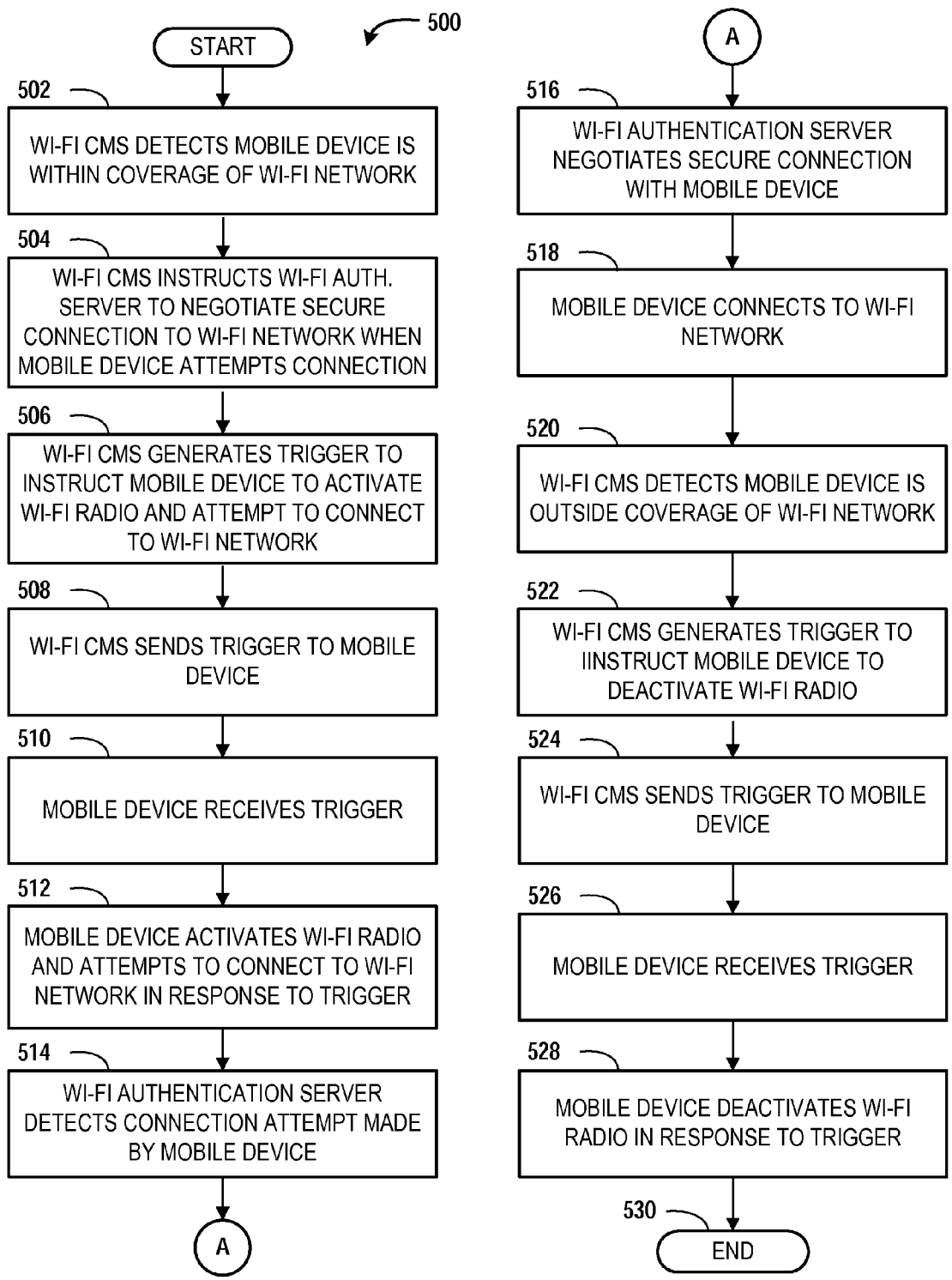
FIG. 5 is a flow diagram illustrating aspects of a method for triggering activation and deactivation of a WI-FI radio of a mobile device, according to an illustrative embodiment.

Turning now to FIG. 5, a method 500 for triggering activation and deactivation of a WI-FI radio of a mobile device will be described, according to an illustrative embodiment.

The method 500 begins and proceeds to operation 502, wherein the WI-FI connection management system 114 detects the mobile device 102 is within a coverage area provided by the WI-FI network 110. The WI-FI connection management system 114 can receive location information from the location system 118 and/or directly from the mobile device 102 and can utilize the location information to determine if the location of the mobile device 102 is within a coverage area provided by the WI-FI network 110. From operation 502, the method 500 proceeds to operation 504, wherein the WI-FI connection management system 114 instructs the WI-FI authentication server 124 to negotiate a secure connection to the WI-FI network 110 when the mobile device 102 attempts to connect to the WI-FI network 110. From operation 504, the method 500 proceeds to operation 506, wherein the WI-FI connection management system 114 generates the trigger 116 to instruct the mobile device 102 to activate the WI-FI radio 108 and attempt to connect to the WI-FI network 110. From operation 506, the method 500 proceeds to operation 508, wherein the WI-FI connection management system 114 sends the trigger 116 to the mobile device 102.

From operation 508, the method 500 proceeds to operation 510, wherein the mobile device 102 receives the trigger 116. From operation 510, the method 500 proceeds to operation 512, wherein, in response to receiving the trigger, the mobile device 102 activates the WI-FI radio 108 and attempts to connect to the WI-FI network 110.

From operation 512, the method 500 proceeds to operation 514, wherein the WI-FI authentication server 124 detects a connection attempt made by the mobile device 102. From operation 514, the method 500 proceeds to operation 516, wherein the WI-FI authentication server 124 negotiates a secure connection with the mobile device 102. For example, the WI-FI authentication server 124 provides authentication credentials to the mobile device 102 for use by the mobile device 102 in establishing a secure connection to the WI-FI network 110. From operation 516, the method 500 proceeds to operation 518, wherein the mobile device 102 connects to the WI-FI network 110.

From operation 518, the method 500 proceeds to operation 520, wherein the WI-FI connection management system 114 detects that the mobile device 102 is outside of the coverage of the WI-FI network 110. The WI-FI connection management system 114 can receive location information from the location system 118 and/or directly from the mobile device 102 and can utilize the location information to determine if the location of the mobile device 102 is outside of the coverage area provided by the WI-FI network 110. From operation 520, the method 500 proceeds to operation 522, wherein the WI-FI connection management system 114 generates the trigger 116 to instruct the mobile device 102 to deactivate (e.g., turn OFF) the WI-FI radio 108. From operation 522, the method 500 proceeds to operation 524, wherein the WI-FI connection management system 114 sends the trigger 116 to the mobile device 102.

From operation 524, the method 500 proceeds to operation 526, wherein the mobile device 102 receives the trigger 116. From operation 526, the method 500 proceeds to operation 528, wherein, in response to receiving the trigger 116, the mobile device 102 deactivates (e.g., turns OFF) the WI-FI radio 108. Alternatively, the WI-FI radio 108 can detect signal strength from the WI-FI network 110 that at least meets a minimum signal strength threshold or can detect no signal from the WI-FI network 110 and, accordingly, can deactivate the WI-FI radio 108 without the trigger 116 from the WI-FI connection management system 114. From operation 528, the method 500 proceeds to operation 530, wherein the method 500 may end.

Figure 6:
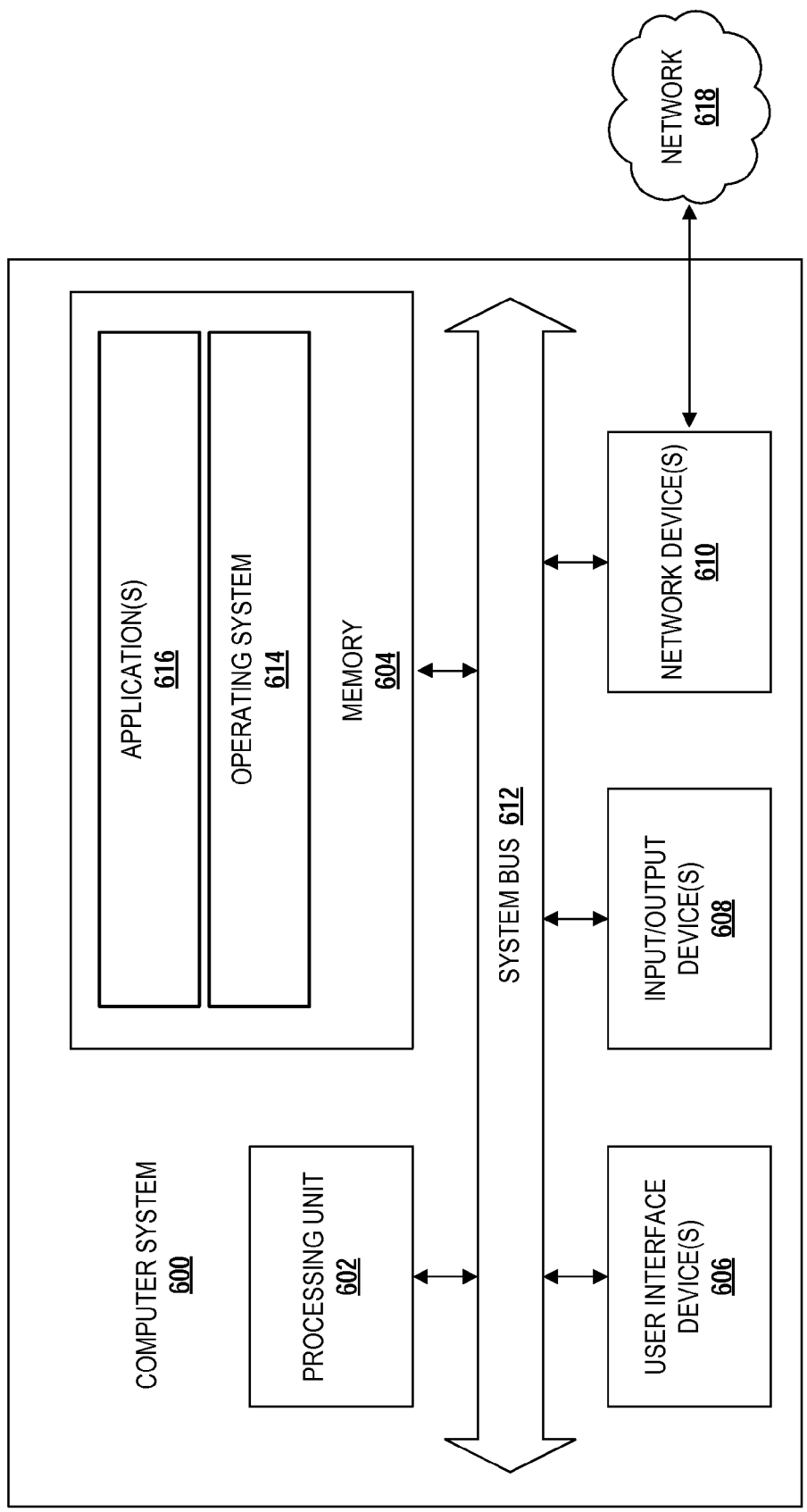
FIG. 6 is a block diagram illustrating an example computer system capable of implementing aspects of the embodiments presented herein.

FIG. 6 is a block diagram illustrating a computer system 600 configured to perform various operations disclosed herein. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610. In some embodiments, the WI-FI connection management system 114, the location system 118, the user profile server 120, and/or the WI-FI authentication server 124 are configured like the computer system 600. It should be understood, however, that the WI-FI connection management system 114, the location system 118, the user profile server 120, and/or the WI-FI authentication server 124 may include additional functionality or include less functionality than now described.

The processing unit 602 may be a standard central processor that performs arithmetic and logical operations, a more specific purpose programmable logic controller ("PLC"), a programmable gate array, or other type of processor known to those skilled in the art and suitable for controlling the operation of the computer system 600. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The illustrated memory 604 includes an operating system 614 and one or more applications 616.

The operating system 614 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like. The application(s) 616 can execute on top of the operating system 614 to provide functionality such as described herein above for the WI-FI connection management system 114, the location system 118, the user profile server 120, or the WI-FI authentication server 124.

The user interface devices 606 may include one or more devices that a user utilizes to access the computer system 600. The user interface devices 606 may include, but are not limited to, computers, servers, personal digital assistants, telephones (e.g., cellular, IP, or landline), or any suitable computing devices. The I/O devices 608 enable a user to interface with the program modules. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network 618, such as the mobile telecommunications network 106, the WI-FI network 110, and/or the data network 112, all of which are illustrated and described with reference to FIG. 1, and/or other network(s). Examples of the network devices 610 include, but are not limited to, a modem, a radio frequency ("RF") or infrared ("IR") transceiver, a telephonic interface, a bridge, a router, or a network card. The network 618 may include a wireless network such as, but not limited to, a WLAN such as a WI-FI network, a WWAN, a wireless PAN ("WPAN") such as BLUETOOTH, or a wireless MAN ("WMAN"). Alternatively, the network 618 may be a wired network such as, but not limited to, a WAN such as the Internet, a LAN such as the Ethernet, a wired PAN, or a wired MAN.

The network 618 embodied as a cellular network may utilize a mobile telecommunications technology such as, but not limited to, GSM, UMTS, CDMA ONE, CDMA2000, LTE, and various other 2G, 2.5G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 618. Therefore, the embodiments presented herein should not be construed as being limiting to a particular mobile telecommunications technology and/or standards utilizing such technologies.

Figure 7:
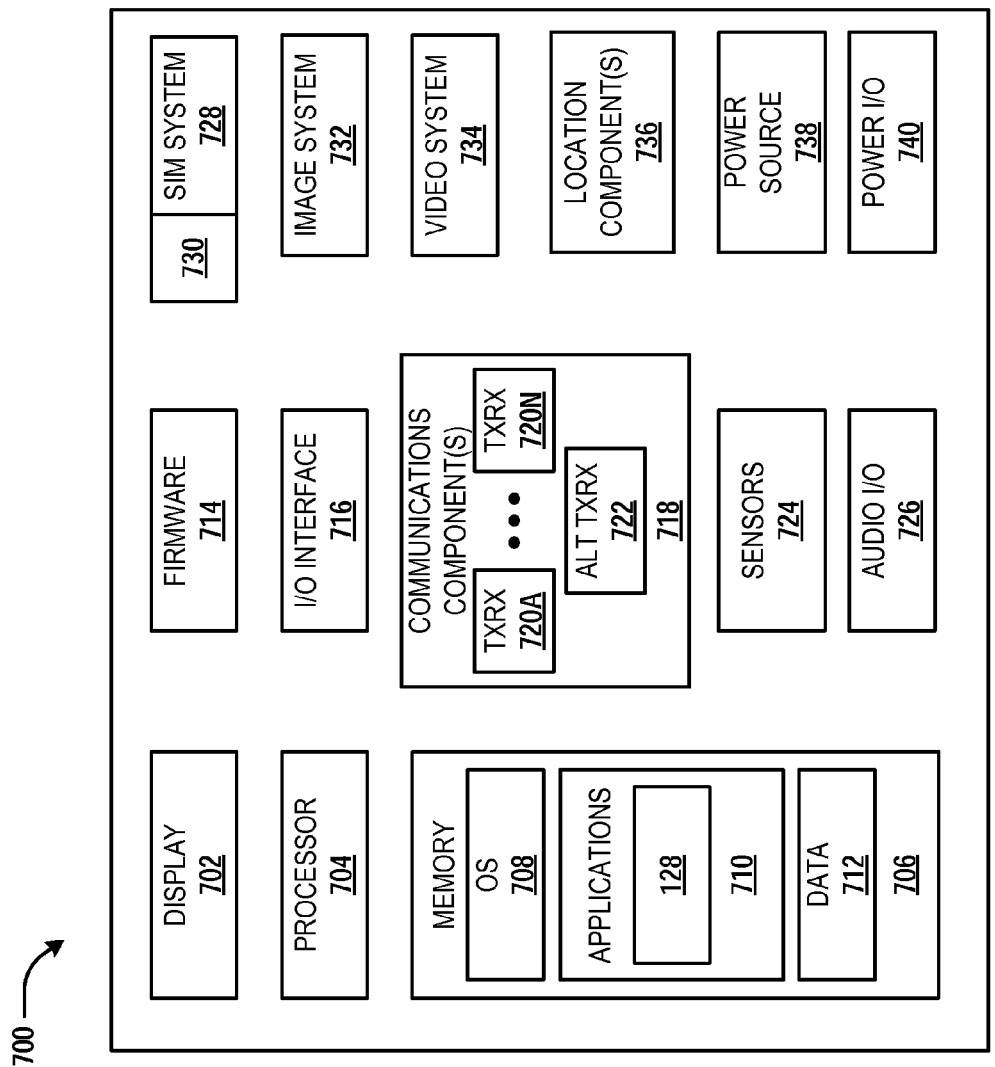
FIG. 7 is a block diagram illustrating an example mobile device capable of implementing aspects of the embodiments disclosed herein.

Turning now to FIG. 7, an illustrative mobile device 700 and components thereof will be described. In some embodiments, the mobile device 102 described above with reference to FIG. 1 can be configured as and/or can have an architecture similar or identical to the mobile device 700 described herein in FIG. 7. It should be understood, however, that the mobile device 102 may or may not include the functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710, which may include the network connection manager 128, other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in answering/initiating calls, data communications, entering/deleting data, entering and setting user IDs and passwords for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The applications 710 can include connection manager 128. The data 712 can include, for example, the connection policy 126, SSIDs, and/or authentication credentials. According to various embodiments, the applications 710 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interfaced 716 can be configured to support the input/output of data such as location information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ411) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the RANs 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an N$^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. In some embodiments, authentication credentials for connecting to one or more WI-FI networks are stored on the SIM system 728. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 700 or other devices or computers described herein, such as the computer system 600 described above with reference to FIG. 6. For purposes of the claims, the phrase "computer-readable storage medium" and variations thereof, does not include waves, signals, and/or other transitory and/or intangible communication media, per se. In an illustrative embodiment, a computer-readable storage medium is a tangible computer-readable storage medium.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the mobile device 700 in order to store and execute the software components presented herein. It is also contemplated that the mobile device 700 may not include all of the components shown in FIG. 7, may include other components that are not explicitly shown in FIG. 7, or may utilize an architecture completely different than that shown in FIG. 7.

Based on the foregoing, it should be appreciated that concepts and technologies for location-based WI-FI radio activation and deactivation for mobile devices have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A WI-FI connection management system comprising:
a processor; and
a memory that stores computer-executable instructions that, when executed by the processor, cause the processor to perform operations comprising
detecting that a mobile device is within a coverage area provided by a WI-FI network,
generating a first trigger to instruct the mobile device to activate a WI-FI radio of the mobile device and connect to the WI-FI network, wherein generating the first trigger to instruct the mobile device to activate the WI-FI radio of the mobile device and connect to the WI-FI network comprises generating the first trigger to instruct the mobile device to deactivate a cellular radio configured to connect the mobile device to a mobile telecommunications network, and
sending the first trigger to the mobile device.

2. The WI-FI connection management system of claim 1, wherein the operations further comprise:
detecting that the mobile device is outside of the coverage area provided by the WI-FI network;

generating a second trigger to instruct the mobile device to deactivate the WI-FI radio of the mobile device; and sending the second trigger to the mobile device.

3. The WI-FI connection management system of claim 1, wherein the operations further comprise requesting authentication credentials from a WI-FI authentication server and receiving the authentication credentials from the WI-FI authentication server, and wherein generating the first trigger comprises generating the first trigger to further instruct the mobile device to connect to the WI-FI network utilizing the authentication credentials.

4. The WI-FI connection management system of claim 1, wherein the operations further comprise instructing a WI-FI authentication server to negotiate a secure connection to the WI-FI network when the mobile device attempts to connect to the WI-FI network.

5. The WI-FI connection management system of claim 1, wherein the WI-FI network is operated by a mobile telecommunications carrier that operates the mobile telecommunications network that the mobile device is capable of connecting to.

6. The WI-FI connection management system of claim 1, wherein detecting that the mobile device is within the coverage area provided by the WI-FI network is based, at least in part, on location information associated with the mobile device and received from the mobile device.

7. The WI-FI connection management system of claim 1, wherein detecting that the mobile device is within the coverage area provided by the WI-FI network is based, at least in part, on location information associated with the mobile device and received from a location system.

8. A method comprising:
   detecting, by a WI-FI connection management system, that a mobile device is within a coverage area provided by a WI-FI network;
   generating, by the WI-FI connection management system, a first trigger to instruct the mobile device to activate a WI-FI radio of the mobile device and connect to the WI-FI network, wherein generating the first trigger to instruct the mobile device to activate the WI-FI radio of the mobile device and connect to the WI-FI network comprises generating the first trigger to instruct the mobile device to deactivate a cellular radio configured to connect the mobile device to a mobile telecommunications network; and
   sending, by the WI-FI connection management system, the first trigger to the mobile device.

9. The method of claim 8, further comprising:
   detecting, by the WI-FI connection management system, that the mobile device is outside of the coverage area provided by the WI-FI network;
   generating, by the WI-FI connection management system, a second trigger to instruct the mobile device to deactivate the WI-FI radio of the mobile device; and
   sending, by the WI-FI connection management system, the second trigger to the mobile device.

10. The method of claim 8, further comprising requesting, by the WI-FI connection management system, authentication credentials from a WI-FI authentication server and receiving, by the WI-FI connection management system, the authentication credentials from the WI-FI authentication server, and wherein generating, by the WI-FI connection management system, the first trigger comprises generating, by the WI-FI connection management system, the first trigger to further instruct the mobile device to connect to the WI-FI network utilizing the authentication credentials.

11. The method of claim 8, further comprising instructing, by the WI-FI connection management system, a WI-FI authentication server to negotiate a secure connection to the WI-FI network when the mobile device attempts to connect to the WI-FI network.

12. The method of claim 8, wherein the WI-FI network is operated by a mobile telecommunications carrier that operates the mobile telecommunications network that the mobile device is capable of connecting to.

13. The method of claim 8, wherein detecting that the mobile device is within the coverage area provided by the WI-FI network is based, at least in part, on location information associated with the mobile device and received from the mobile device.

14. The method of claim 8, wherein detecting that the mobile device is within the coverage area provided by the WI-FI network is based, at least in part, on location information associated with the mobile device and received from a location system.

15. A mobile device comprising:
   a cellular radio;
   a WI-FI radio;
   a processor; and
   a memory that stores computer-executable instructions that, when executed by the processor, cause the processor to perform operations comprising
      receiving a first trigger from a WI-FI connection management system, the first trigger comprising instructions from the WI-FI connection management system to activate the WI-FI radio and connect to a WI-FI network and to deactivate the cellular radio configured to connect the mobile device to a mobile telecommunications network,
      deactivating the cellular radio per the instructions included in the first trigger,
      activating the WI-FI radio per the instructions included in the first trigger, and
      connecting to the WI-FI network per the instructions included in the first trigger.

16. The mobile device of claim 15, wherein receiving the first trigger comprises receiving the first trigger in response to the mobile device being within a coverage area provided by the WI-FI network.

17. The mobile device of claim 15, wherein the operations further comprise:
   in response to the mobile device being outside of a coverage area provided by the WI-FI network, receiving a second trigger from the WI-FI connection management system, the second trigger comprising instructions from the WI-FI connection management system to deactivate the WI-FI radio of the mobile device; and
   deactivating the WI-FI radio per the instructions included in the second trigger.

18. The mobile device of claim 15, wherein the first trigger further comprises authentication credentials, and the instructions included in the first trigger further comprise instructions to connect to the WI-FI network utilizing the authentication credentials.

19. The mobile device of claim 15, wherein the operations further comprise:
   receiving a second trigger from the WI-FI connection management system, the second trigger comprising instructions from the WI-FI connection management system to deactivate the WI-FI radio of the mobile device and reactivate the cellular radio based at least in part upon a load of the WI-FI network;

deactivating the WI-FI radio per the instructions included in the second trigger; and reactivating the cellular radio per the instructions included in the second trigger.

20. The mobile device of claim 15, wherein the WI-FI network is operated by a mobile telecommunications carrier that operates the mobile telecommunications network that the mobile device is capable of connecting to, and wherein the operations further comprise:

in response to the mobile device being outside of a coverage area provided by the WI-FI network, receiving a second trigger from the WI-FI connection management system, the second trigger comprising instructions from the WI-FI connection management system to deactivate the WI-FI radio of the mobile device and reactivate the cellular radio;

deactivating the WI-FI radio per the instructions included in the second trigger; and reactivating the cellular radio per the instructions included in the second trigger.

* * * * *